United States Patent Office 2,994,700
Patented Aug. 1, 1961

2,994,700
ACETAMIDE DERIVATIVES
John Krapcho, New Brunswick, N.J., assignor to Olin Mathieson Chemical Corporation, New York, N.Y., a corporation of Virginia
No Drawing. Filed Apr. 7, 1960, Ser. No. 20,545
8 Claims. (Cl. 260—295)

This invention relates to new diphenylacetamide derivatives and, more particularly, to compounds of the general formula

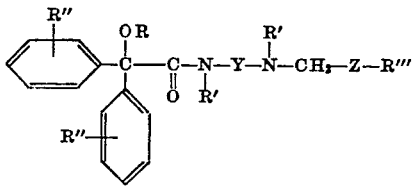

wherein R is a lower alkyl radical, preferably of less than five carbon atoms (e.g. methyl, ethyl, propyl, isopropyl and butyl), R' is lower alkyl (e.g. methyl, ethyl, propyl, butyl and hexyl) or lower alkenyl (e.g. allyl, methallyl, 2-butenyl and 2-hexenyl); R'' is hydrogen, halogen (e.g. chlorine and fluorine), halomethyl (e.g. trifluoromethyl), lower alkyl (e.g. methyl and ethyl), lower alkoxy (e.g. methoxy and ethoxy), hydroxy, nitro, amino, cyano, lower alkanoyloxy (e.g. acetoxy) or phenyl; Y is a lower alkylene radical separating the nitrogens by at least two carbon atoms and incudes such radicals as ethylene, propylene, butylene and hexylene, whether branched or straight chained; Z is lower alkylene, either straight or branched chain, such as methylene, ethylene and propylene, oxo-lower alkylene (e.g. carbonyl and carbonylmethylene), amino-lower alkylene (e.g., aminoethylene and aminopropylene) and ethylene; R''' is an aromatic group as phenyl, R''-substituted phenyl, thienyl, furyl, or pyridyl; and the pharmaceutically acceptable acid-addition and quaternary salts thereof. The preferred compounds are those where R is lower alkyl, R' is lower alkyl, R'' is hydrogen, R''' is phenyl, Y is ethylene and Z is methylene.

Examples of suitable acid-addition salts of the free base compounds of this invention include the mineral acid salts, such as the hydrohalide (e.g. hydrochloride, hydrobromide and hydroiodide), the sulfate, the phosphate, and the organic acid salts, such as the citrate, tartrate, oxalate, ascorbate and succinate. (Pharmacologically acceptable acids are, of course, employed where the salt form is prepared for therapeutic use.)

Representative quaternary salts of the free base compounds of this invention may be formed by treatment of the base with such reagents as lower alkyl esters (e.g. methyl chloride, methyl bromide, ethyl bromide, dimethyl sulfate, and ethyl nitrate) and aralkyl esters (e.g. benzyl chloride) and other similar esters of inorganic acids.

The compounds of the present invention can be prepared by a variety of methods. One suitable method involves the reaction of a α-halodiphenylacetyl halide with a diamine of the formula HR'N—Y—NR'CH$_2$Z—R''', wherein R' R''', Y and Z are as hereinbefore defined, and treating the resultant intermediate with an alkanol or alkoxide of the formula ROA, wherein R is as hereinbefore defined, and A is hydrogen or alkali metal, to yield the final product.

In an alternative procedure an α-alkoxy-N-alkyl-N-(alkylaminoalkyl)-diphenylacetamide is reacted with a R'''—Z—CH$_2$ halide to yield the desired final product. The α-alkoxy-N-alkyl-N-(alkylaminoalkyl)-diphenyl acetamide can be prepared by a sequence of steps in which a benzylalkylamino alkyl chloride is reacted with an alkylamine; the resulting N-benzyl-N,N'-dialkylalkylene diamine is reacted with a bis(halophenyl) α-chloro acetyl chloride and a lower alkanol, and the resulting product is hydrogenated to yield the α-alkoxy-N-alkyl-N-(alkylaminoalkyl) - diphenylacetamide employed in the preparation of the final product.

The compounds of this invention are useful as analgesics. They can be administered either perorally or intramuscularly in the same manner as meperidine hydrochloride for the alleviation of pain. They have been found to have several times the potency of the most closely related compound of the prior art, namely, the diphenyl acetamide derivatives disclosed in U.S. Patent No. 2,862,965.

The following examples illustrate the invention (all temperatures given are in degree centigrade):

EXAMPLE I

2 - ethoxy - N - methyl - N - [2 - N' - methyl - N' - phenethylamino)ethyl] - 2,2 - diphenylacetamide, hydrochloride (A) Preparation of 2-(N-methyl-N-phenethylamino)-ethanol.—A solution of 98.6 g. of 2-methylaminoethanol in 500 ml. of xylene is treated portionwise with 242 g. of 2-bromoethylbenzene. The mixture is stirred and refluxed for thirteen hours and cooled. To the oily layer which separates from the mixture there is added 200 ml. of water, followed by a solution of 60 g. of sodium hydroxide in 200 ml. of water and 300 ml. of ether. The mixture is shaken and the organic phase cooled and extracted with a solution of 110 ml. of concentrated hydrochloric acid in 150 ml. of water. The resulting aqueous phase is cooled, treated portionwise with a solution of 60 g. of sodium hydroxide in 200 ml. of water and the liberated base extracted several times with ether. After drying over magnesium sulfate, the ether is evaporated and the product fractionated to give about 129.2 g. of 2 - (N - methyl - N-phenethylamino)ethanol; B.P. about 88–92° (0.2 mm.).

(B) Preparation of 2-(N-methyl-N-phenylamino)ethyl chloride, hydrochloride.—A solution of 110 g. of 2-(N-methyl-N-phenethylamino)ethanol from part (A) in 300 ml. of chloroform is stirred, cooled and treated dropwise with 90 ml. of thionyl chloride, while maintaining the reaction temperature at 20–25°. After standing overnight at room temperature, the mixture is refluxed for two hours and then 165 ml. of liquid is distilled. The residue is cooled and diluted with 500 ml. of ether to give an oil which begins to crystallize. After cooling, the colorless solid is filtered, washed well with ether and dried in a desiccator; yield about 144 g. of 2-(N-methyl-N-phenethylamino) ethyl chloride hydrochloride; M.P. about 112–115°.

(C) Preparation of N,N'-dimethyl-N-phenethylethylenediamine.—To 232 g. of cold monomethylamine (40% aqueous) there is added the hydrochloride salt from part (B). The salt dissolves, followed by the separation of an oil. The mixture is stirred for one hour at room temperature and then heated at 70–90° for four hours. After standing overnight, the mixture is cooled and treated portionwise with 100 g. of sodium hydroxide pellets and the product extracted three times with ether. After drying over magnesium sulfate, the resultant product is fractionated, providing about 67.7 g. of N,N'-dimethyl-N-phenethylethylenediamine, B.P. about 75–78° (0.2 mm.).

(D) Preparation of 2-ethoxy-N-methyl-N-[2-(N'-methyl-N'-phenethylamino)ethyl]-2,2-diphenylacetamide, hydrochloride.—A solution of 65.0 g. of α-chloro-diphenylacetyl chloride in 400 ml. of benzene is treated with a solution of 47.1 of the diamine from part (C) in 100 ml. of benzene while the temperature is maintained at 20–

25°. A heavy precipitate separates from the mixture. After stirring for two hours at room temperature, the mixture is refluxed for one hour and then treated dropwise with 500 ml. of absolute alcohol while distilling off 700 ml. of solvent. The residue is treated with 700 ml. of absolute alcohol and then refluxed for ten hours. The bulk of the solvent is distilled at atmospheric pressure and the remainder (300 ml.) is concentrated to about 100 ml. under reduced pressure. Dilution of the residue to about 2 liters with anhydrous ether yields about 111 g. of nearly colorless solid; M.P. about 160–165°. 110 g. of this material is dissolved in 300 ml. of isopropyl alcohol and the turbid solution is treated with activated charcoal and filtered. Dilution of the filtrate to 1.5 l. with ether yields a colorless solid weighing about 102 g.; M.P. about 160–165°. Upon recrystallization from 200 ml. of acetonitrile (a small quantity of insoluble material is filtered), there is obtained about 89.0 g. of 2-ethoxy - N-methyl-N-[2-(N'-methyl-N'-phenethylamino)-ethyl]-2,2-diphenylacetamide, hydrochloride; M.P. about 163–165°.

EXAMPLE 2

2-ethoxy-N-methyl-N-[2-(N'-methyl-N'-phenethylamino)-ethyl]-2,2-diphenylacetamide, hydrochloride (A) *Preparation of 2-ethoxy-N-methyl-2,2-diphenylacetamide.*—A cold solution of 265 g. of α-chlorodiphenyl acetyl chloride in 1130 ml. of benzene is stirred and treated dropwise with a cold solution of 62 g. of monomethylamine in 675 ml. of benzene over a period of twenty minutes. The mixture is stirred for two hours at room temperature, allowed to stand overnight and then refluxed for 45 minutes. About 1 liter of solvent is distilled during the course of addition of 500 ml. of absolute alcohol. The residue is then diluted with 1 liter of absolute alcohol, refluxed for eight hours and concentrated until about 300 ml. of residue remains. The latter is treated with 500 ml. of water and extracted with ether several times. The ether extract is dried over magnesium sulfate and concentrated. Fractionation of the residue gives about 202 g. of a distillate having a B.P. of about 151–157° (0.5 mm.). Upon standing, the distillate solidified, M.P. about 88–98°. Recrystallization of 23.4 g. of this material from 100 ml. of hexane, yields about 18.5 g. of 2-ethoxy-N-methyl-2,2-diphenylacetamide; M.P. about 98–100°.

(B) *Preparation of 2-ethoxy-N-methyl-N-[2-(N'-methyl-N'-phenethylamino)ethyl]-2,2-diphenylacetamide, hydrochloride.*—A suspension of 4.0 g. of sodamide in 100 ml. of toluene is treated with a solution of 27.0 g. of the amide from part (A) in 200 ml. of toluene and the mixture is stirred and refluxed for thirty minutes. The mixture is cooled to room temperature and treated with toluene solution of 2-(methylphenethylamino)-ethyl chloride (prepared by treatment of a suspension of 25 g. of the hydrochloride from part (B) of Example 1 in 25 ml. of water with a solution of 14 g. of potassium carbonate in 25 ml. of water, and extracting the liberated base three times with toluene and drying over magnesium sulfate). The mixture is refluxed for three hours, cooled and washed with 100 ml. of water. The toluene solution is dried over magnesium sulfate, filtered and treated with a slight excess of alcoholic hydrogen chloride to give 2-ethoxy-N-methyl - N-[2-(N'-methyl-N'-phenethylamino)ethyl]-2,2-diphenylacetamide, hydrochloride; M.P. about 163–165°.

EXAMPLE 3

2,2-bis(o-chlorophenyl)-2-ethoxy-N-methyl-N-[2-(N'-methyl-N'-phenethylamino)ethyl]-acetamide, hydrochloride Interaction of 33.4 g. of 2,2-bis(o-chlorophenyl)-2-chloroacetyl chloride with 19.2 g. of N,N'-dimethyl-N-phenethylethylenediamine [described under Example 1, part (C)] in benzene solution followed by treatment with absolute alcohol according to the procedure described in Example 1, part (D) yields 2,2-bis(o-chlorophenyl)-2-ethoxy-N-methyl-N-[2-(methylphenethylamino)ethyl] acetamide hydrochloride.

EXAMPLE 4

N-(2-[N'-(p-nitrophenethyl)-N'-methylamino]ethyl)-2-ethoxy-N-methyl-2,2-diphenylacetamide, hydrochloride (A) *Preparation of N-benzyl-N,N'-dimethylethylenediamine.*—Interaction of 258 g. of 2-(N-benzyl-N-methylamino)ethyl chloride hydrochloride with 500 g. of 40% aqueous monomethylamine according to the procedure described under Example 1, part (C) yields about 137 g. of N-benzyl-N,N'-dimethylethylenediamine; B.P. about 80–82° (0.5 mm.).

(B) *Preparation of N-[2-(N'-benzyl-N'-methylamino)ethyl]-2-ethoxy-N-methyl-2,2-diphenylacetamide, hydrochloride.*—A solution of 85 g. of the amine from part (A) in 200 ml. of benzene is added dropwise to a solution of 126 g. of α-chlorodiphenylacetyl chloride in 1000 ml. of benzene followed by treatment with absolute ethanol as in Example 1, part (D). About 202 g. of N-[2-(N' - benzyl-N'-methylamino)ethyl]-2-ethoxy-N-methyl- 2,2-diphenylacetamide hydrochloride are obtained; M.P. about 158–163° C. Upon recrystallization from 450 ml. of acetonitrile-450 ml. of ether the purified product has an M.P. of about 162–164°.

(C) *Preparation of 2-ethoxy-N-methyl-N-(2-methylaminoethyl)-2,2-diphenylacetamide, hydrochloride.*—A warm solution of 35.0 g. of N-[2-(N'-benzyl-N'-methylamino)ethyl] - 2-ethoxy-N-methyl-2,2-diphenylacetamide, hydrochloride from part (B) is treated with a suspension of 3 g. of 5% palladium on carbon and placed in a Parr apparatus at 55# of hydrogen. Hydrogenation is complete in about thirty minutes. The product crystallizes from solution. The mixture is heated and diluted with 200 ml. of absolute alcohol to dissolve the product, filtered and the cooled filtrate is diluted with about 300 ml. of ether to give a crystalline solid weighing about 28.1 g.; M.P. about 200–201°. Recrystallization from 230 ml. of absolute alcohol yields about 24.7 g. of 2-ethoxy - N-methyl-N-(2-methylaminoethyl)-2,2-diphenylacetamide hydrochloride having a melting point of about 202–203°.

(D) *Preparation of N - {2 - [N' - (nitrophenethyl)-N'-methylamino]ethyl} - 2 - ethoxy - N - methyl - 2,2 - diphenylacetamide, hydrochloride.*—A suspension of 25.0 g. of 2-ethoxy-N-methyl-N-(2-methylaminoethyl)-2,2-diphenylacetamide hydrochloride from part (C) in 200 ml. of water is treated with a solution of 3.0 g. of sodium hydroxide in 30 ml. of water. The liberated base is extracted with ether and dried over magnesium sulfate. After evaporation of the solvent, the free base weighs about 19.5 g., M.P. about 45–48°. This material is dissolved in 300 ml. of xylene and treated with a solution of 14.0 g. of p-nitrophenethyl bromide in 200 ml. of xylene. The mixture is stirred and refluxed for seven hours, at the end of which a solid separates from the mixture. After cooling, the solid is filtered off and dried; weight about 17.3 g.; M.P. 190–191°. This material is mainly the hydrobromide of the starting material. The xylene filtrate is treated with a slight excess of alcoholic hydrogen chloride to give about 9.0 g. of a solid material, M.P. about 120–122°. Recrystallization from 40 ml. acetonitrile-200 ml. of ether, yields about 7.5 g. of purified material having a melting point of about 119–124°. 7.0 g. of this material is suspended in 70 ml. of water and allowed to stand overnight at room temperature. The mixture is filtered and the residue dried, providing about 6.6 g. of product, M.P. about 175–176°. Recrystallization from 40 ml. acetonitrile-200 ml. ether yields N - {2 - [N' - (p - nitrophenethyl) - N' - methylamino]ethyl} - 2 - ethoxy - N - methyl - 2,2 - diphenylacetamide, hydrochloride; M.P. about 177–178°.

EXAMPLE 5

N - {2 - [N' - (p - aminophenethyl) - N' - methylamino]ethyl} - 2 - ethoxy - N - methyl - 2,2 - diphenylacetamide, dihydrochloride A suspension of 6.3 g. of material from Example 4 in 150 ml. of absolute alcohol is treated with a suspension of 3.0 g. of 5% palladium-on-charcoal and the mixture placed in a Parr apparatus under 55 pounds of hydrogen. Reduction is complete in five minutes. The solution is filtered and the filtrate treated with 2.2 ml. of 5.5 N alcoholic hydrogen chloride, followed by dilution to 700 ml. with ether. About 6.3 g. of N{-2-[N'-(p-aminophenethyl) - N' - methylamino]ethyl} - 2 - ethoxy-N-methyl - 2,2 - diphenylacetamide, dihydrochloride is obtained; M.P. about 189–190° (dec.).

EXAMPLE 6

2 - ethoxy - N - methyl - N - [2 - (N' - methyl - N' - phenacylamino)ethyl] - 2,2 - diphenylacetamide, hydrochloride Replacement of the p-nitrophenethyl bromide by an equivalent amount of phenacyl bromide in Example 4, part (D) yields the colorless, crystalline hydrochloride of 2 - ethoxy - N - methyl - N - [2 - (N' - methyl - N'- phenacylamino)ethyl]-2,2-diphenylacetamide.

EXAMPLE 7

N - {2 - [N' - (2 - benzoylethyl) - N' - methylamino]ethyl} - 2 - ethoxy - N - methyl - 2,2 - diphenylacetamide, hydrochloride Substitution of an equivalent amount of β-bromopropiophenone for p-nitrophenethyl bromide in Example 4, part (D) yields the colorless crystalline hydrochloride of N - {2 - [N' - (2 - benzoylethyl) - N' - methylamino]ethyl}-2-ethoxy-N-methyl-2,2-diphenylacetamide.

EXAMPLE 8

N - [2 - (N' - cinnamyl - N' - methylamino)ethyl] - 2-ethoxy - N - methyl - 2,2 - diphenylacetamide, hydrochloride By employing an equivalent cinnamyl bromide in place of p-nitrophenethyl bromide in Example 4, part (D) the colorless crystalline hydrochloride of N-[2-(N'-cinnamyl-N' - methylamino)ethyl] - 2 - ethoxy - N - methyl - 2,2-diphenylacetamide is obtained.

EXAMPLE 9

2 - ethoxy - N - methyl - N - {2 - [N' - methyl - N' - (4-pyridylethyl)amino]ethyl} - 2,2 - diphenylacetamide, dihydrochloride A solution of 10 g. of 2-ethoxy-N-methyl-N-(2-methylaminoethyl)-2,2-diphenylacetamide [described in Example 4, part (D)] in 400 ml. of xylene is treated with 15 g. of freshly distilled 4-vinylpyridine and the resulting solution is refluxed for sixteen hours. The solvent is removed under reduced pressure, the residue dissolved in 400 ml. of ether and extracted with 20 ml. of water. After drying over magnesium sulfate, the ethereal solution is concentrated and the residue fractionated to give a nearly colorless distillate boiling at about 200° at 0.2 mm. Treatment of a solution of this base in absolute alcohol with excess alcoholic hydrogen chloride yields the colorless dihydrochloride salt of 2-ethoxy-N-methyl-N - {2 - [N' - methyl - N' - (4 - pyridylethyl)amino]ethyl}-2,2-diphenylacetamide.

EXAMPLE 10

2 - ethoxy - N - methyl - N - {2 - [4 - N' - methyl - N' - (methylphenyl)amino]ethyl} - 2,2 - diphenylacetamide, dihydrochloride A mixture of 18.2 g. of 2-ethoxy-N-methyl-N-(2-methylaminoethyl)-2,2-diphenylacetamide, hydrochloride from Example 4, part (C)—13.5 g. 2-(4-methylanilino)ethyl bromide hydrobromide, 20 g. of anhydrous sodium carbonate and 100 ml. of butanol is refluxed for twenty-four hours. The inorganic salts are filtered and the filtrate concentrated under reduced pressure. The residue is dissolved in anhydrous ether and treated with slight excess of alcoholic hydrogen chloride to give a colorless salt. Upon purification by recrystallization, the dihydrochloride of 2-ethoxy-N-methyl-N-{2-[N'-methyl-N'-(4 - methylphenylamino]ethyl} - 2,2 - diphenylacetamide is obtained.

EXAMPLE 11

2 - ethoxy - N - ethyl - N - [2 - (N' - allyl - N' - phenethylamino)ethyl[ - 2,2 - bis - (m - trifluoromethylphenyl)acetamide, hydrochloride (A) *Preparation of 2 - (N - allyl - N - phenethylamino)ethanol.*—Following the procedure of Example 1(A) but substituting 2-allylaminoethanol for 2-methylaminoethanol the product 2-(N-allyl-N-phenethylamino)ethanol is obtained.

(B) *Preparation of 2-(N-allyl-N-phenethylamino)ethyl chloride, hydrochloride.*—The 2 - (N - allyl-N-phenethylamino)ethanol from part (A), supra is treated with thionyl chloride in chloroform in accordance with Example 1(B) yielding 2-(N-allyl-N-phenethylamino)ethyl chloride, hydrochloride.

(C) *Preparation of N-allyl-N'-ethyl-N-phenethyl-ethylenediamine.*—The hydrochloride salt from part (B), supra is treated with ethylamine in accordance with Example 1(C), and N-allyl-N'ethyl-N-phenethylethylenediamine is obtained.

(D) *Preparation of 2-ethoxy-N-ethyl-N-[2-(N'-allyl-N' - phenethylamino)ethyl] - 2,2 - bis - (m - trifluoromethylphenyl)-acetamide, hydrochloride.*—Following the procedure of Example 1(D), the amine from part (C) supra is reacted with 2-chloro-2,2-bis-(m-trifluoromethylphenyl)acetylchloride in benzene while the temperature of the reaction is maintained between 20–25°. The reaction mixture is then refluxed, treated with ethanol and further refluxed. The solvent is then distilled off and the reaction mixture treated with ether to yield the product 2-ethoxy-N-ethyl-N-[2-(N'-allyl-N'-phenethylamino)ethyl] - 2,2 - bis(m - trifluoromethylphenyl)acetamide, hydrochloride.

EXAMPLE 12

2 - ethoxy - N - methyl - N - [2 - N' - methyl - N' - phenethylamino)ethyl] - 2,2 - bis(p - nitrophenyl)acetamide, hydrochloride The ethylenediamine of Example 1(D) is reacted with 2-chloro 2,2-bis-p-nitrophenylacetyl chloride, and the resulting reaction product obtained treated with ethanol, in accordance with 1(D), yielding 2-ethoxy-N-methyl-N - [2 - N' - methyl - N' - phenethylamino)ethyl] - 2,2-bis(p-nitrophenyl)acetamide, hydrochloride.

Similarly, but the substitution of the above nitro compound in Example 5 there is obtained the product 2-ethoxy - N - methyl - N - [2 - (N' - methyl - N' - phenethylamino)ethyl] - 2,2 - bis(m - aminophenyl)acetamide, hydrochloride.

Similarly, the substitution of 2-chloro-2,2-bis-(o-cyanophenyl)acetyl chloride for α-chloro-diphenylacetyl chloride in the procedure of Example 1(D) yields 2-ethoxy-N - methyl - N - [2 - N' - methyl - N' - phenethylamino]-ethyl-2,2-o-cyanophenacetamide, hydrochloride; the substitution of 2-chloro-2,2-bis-(p-acetoxyphenyl)acetyl chloride yields 2-ethoxy-N-methyl-N-[2-(N'-methyl-N'-phenethylamino)ethyl] - 2,2 - bis - (p - acetoxyphenyl)acetamide, hydrochloride; the substitution of 2-chloro-2,2-di-o-tolylacetyl chloride yields 2-ethoxy-N-methyl-N-[2-(N' - methyl - N' - phenethylamino)ethyl] - 2,2 - di - o-tolylacetamide, hydrochloride; and the substitution of 2-chloro - 2 - (m - methoxyphenyl) - 2 - phenylacetyl chloride yields 2-ethoxy-N-methyl-N-[2-(N'-methyl-N'-phenethylamino)ethyl] - 2 - (m - methoxy) - 2 - phenyl acetamide, hydrochloride.

Cleavage of the methoxyl function in the last named product in the conventional manner (by refluxing in 48% hydrogen bromide) yields 2-ethoxy-N-methyl-N-[2-(N'-methyl - N' - phenethylamino)ethyl] - 2 - (m - hydroxyphenyl)-2-phenylacetamide, hydrochloride.

EXAMPLE 13

By substituting 2-chloro-2,2-bis-p-nitrophenylacetyl chloride for α-chlorodiphenylacetyl chloride in Example 4(B) and carrying out the following procedures of Examples 4(C) and (D) and Example 5, 2-ethoxy-N-methyl - N - [2 - (N' - methyl - N' - phenethylamino)-ethyl]-2,2-bis-(m-aminophenyl)acetamide, hydrochloride is obtained.

The invention may be variously otherwise embodied within the scope of the appended claims.

What is claimed is:

1. A compound selected from the class consisting of compounds of the following formula

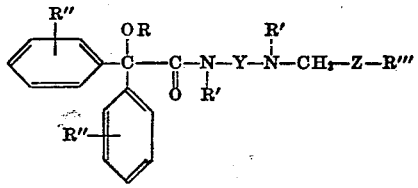

wherein R is lower alkyl, R' is a member selected from the group consisting of lower alkyl and lower alkenyl, R" is a member selected from the group consisting of hydrogen, halogen, halomethyl, lower alkyl, lower alkoxy, hydroxy, nitro, amino, cyano, lower alkanoyloxy and phenyl, Y is a lower alkylene radical, Z is a member selected from the group consisting of lower alkylene, oxo-lower alkylene, amino-lower alkylene and ethenylene and R''' is a member selected from the group consisting of mono-R"-substituted phenyl, thienyl, furyl and pyridyl; and the pharmaceutically-acceptable salts thereof.

2. 2 - ethoxy - N - methyl - N - [2 - (N' - methyl - N'-phenethylamino)ethyl]-2,2-diphenylacetamide.

3. A pharmaceutically acceptable acid-addition salt of the compound of claim 2.

4. N - {2 - [N' - (p - aminophenethyl) - N' -methylamino]ethyl} - 2 - ethoxy - N - methyl - 2,2 - diphenylacetamide, dihydrochloride.

5. N - {2 - [N' - (2-benzoylethyl) - N' - methylamino]-ethyl}2 - ethoxy - N - methyl - 2,2 - diphenylacetamide, hydrochloride.

6. N - [2 - (N' - cinnamyl - N' -methylamino)ethyl]-2-ethoxy-N-methyl-2,2-diphenylacetamide, hydrochloride.

7. 2 - ethoxy - N - methyl - N - {2 - [N' - methyl - N'-(4 - pyridylethyl) - amino]ethyl} - 2,2 - diphenylacetamide, dihydrochloride.

8. 2 - ethoxy - N - methyl - N - (2 - methylaminoethyl)-2,2-diphenylacetamide.

References Cited in the file of this patent

UNITED STATES PATENTS

| | | |
|---|---|---|
| 2,634,274 | Krimmel | Apr. 7, 1953 |
| 2,733,256 | Krapcho et al. | Jan. 31, 1956 |
| 2,862,965 | Lott | Dec. 2, 1958 |
| 2,932,645 | Sumerford et al. | Apr. 12, 1960 |

OTHER REFERENCES

Tangy et al.: Journal American Chemical Society, vol. 72, pages 3004–07 (1950).

Hromatka et al.: Monatschefte fur Chemie, vol. 85, pages 1216–22 (1954).

Philips: Journal American Chemical Society, vol. 76, pages 1955–56 (1954).

Krapcho et al.: Journal American Chemical Society, vol. 77, pages 3632–34 (1955)